July 10, 1923.

J. REECE

POWER TRANSMISSION APPARATUS

Filed Jan. 25, 1922

John Reece
Inventor,
by Rogers, Kennedy & Campbell,
Attorneys.

July 10, 1923. 1,461,558
J. REECE
POWER TRANSMISSION APPARATUS
Filed Jan. 25, 1922 3 Sheets-Sheet 2

John Reece
Inventor,
by Rogers, Kennedy & Campbell,
Attorneys.

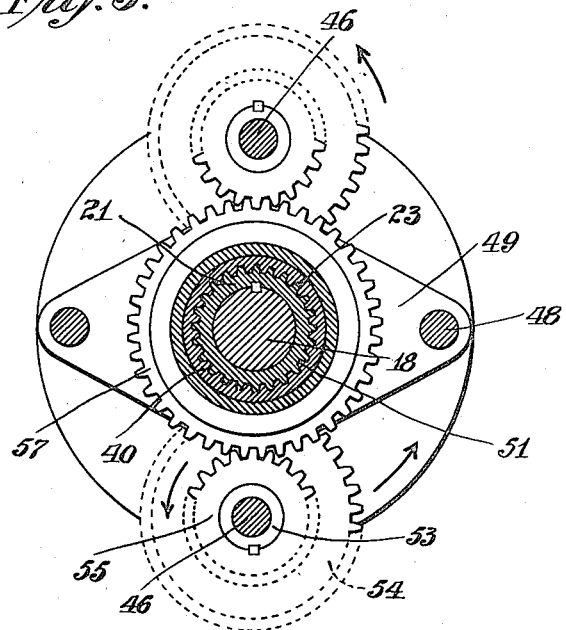
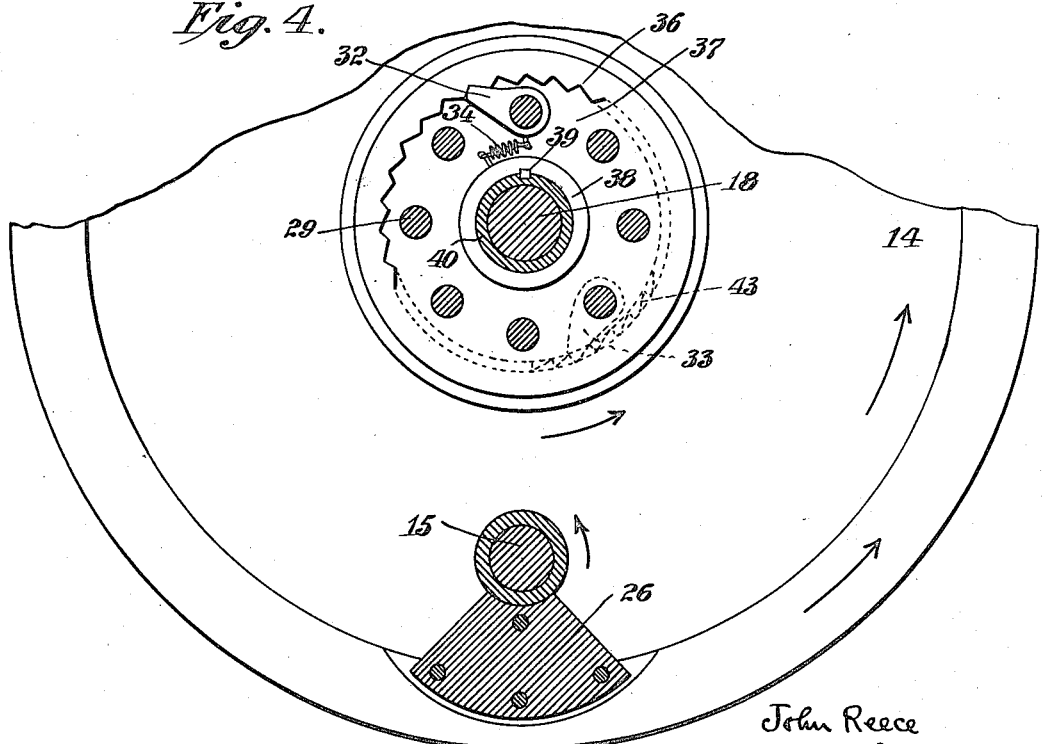

Patented July 10, 1923.

1,461,558

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

POWER-TRANSMISSION APPARATUS.

Application filed January 25, 1922. Serial No. 531,592.

*To all whom it may concern:*

Be it known that I, JOHN REECE, a citizen of the United States, residing at Boston, in the county of Suffolk and State of Massachusetts, have invented certain new and useful Improvements in Power-Transmission Apparatus, of which the following is a specification, reference being had therein to the accompanying drawing.

This invention is a novel power transmission apparatus adapted to use in various situations and for various purposes, for example, as a part of the power transmission mechanism of motor vehicles.

The general object is to provide an improved variable speed transmision for motor vehicles, and more especially to afford a mechanism by which the speed ratio between the engine and the driven parts is self adjusting to any required degree between the maximum and minimum, so as to deliver the requisite torque to the driven parts. With a motor vehicle this means that the speed ratio and torque of the mechanism are self varying to suit the road conditions, for example when running from level ground to uphill the mechanism will so operate as to deliver greater torque at slower speed, the car slowing down and climbing the hill without requiring the attention of the operator; it being understood of course that the operator has supplemental control through the throttle, so that he can cause the engine to speed up when the ratio decreases and vice versa. The present invention therefore, while working in effective cooperation with the throttle, is independent thereof, and has to do merely with the transmission between the driving and driven shafts.

I have already filed on March 11, 1920, an earlier application Serial No. 364,897 relating to the same general objects as above stated, and the prior case recites other objects and advantages which largely apply to the present invention, and need not here be repeated. A further object of the present case is to afford a more continuous transmission of driving torque and therefore a greater freedom from liability to pulsating or irregular action in the transmission. Other objects and advantages will be made clear in the following description of one form or embodiment thereof or will be obvious to those skilled in the art.

To the attainment of the objects and advantages mentioned, the present invention consists in the novel variable speed transmission and the novel features of combination, arrangement, mechanism, design, detail and method herein described or claimed.

Preliminarily it may be stated that this invention, like that of the prior case, involves one or more planetating centrifugal weights carried around with the fly wheel or driving member, these weights having inward and outward movements produced by reason of the difference in speeds of the driving and driven shafts and so arranged that the centrifugal force of the weights, opposing the inward pulling thereof, operates to urge forwardly the driven shaft, or at least an intermediate member, which primarily receives the thrusts and transmits them to the driven shaft. With the prior mechanism the operation of the weights involves two phases of action. While the weights are moving inwardly, forward rotation is transmitted, but while the weights are moving outwardly the tendency would be the reverse, and therefore the intermediate and driven members are held to prevent reverse movement, for a definite period or phase, while the centrifugal force of the outwardly moving weights is otherwise taken care of. The result is an intermittent action, a forward impulse being followed by a period of inaction; consequently the prior mechanism relies upon the use of an elastic transmitting element or spring between the intermediate and driven members, capable of receiving and storing the energy of the impulses, and delivering the energy continuously to the driven shaft. An important difference in the present invention over the prior construction is the doing away with the non-transmitting phase, and causing energy to be substantially continuously transmitted from the driving member, through the centrifugal weights, to the intermediate and driven members, from which it follows that the transmitting spring between the intermediate and driven members may be dispensed with. This feature, broadly considered, constitutes one of the important features of the present invention, and in a more restricted aspect the specific construction and operation of the disclosed embodiment involves further points of novelty.

In the accompanying drawings Fig. 1 is a central vertical longitudinal section of a power transmission apparatus embodying the present invention, adjusted to give what may be termed forward drive of the driven shaft.

Fig. 3 is a transverse section taken on the line 3—3 of Fig. 1.

Fig. 4 is a transverse section taken on the line 4—4 of Fig. 1.

Figure 1:
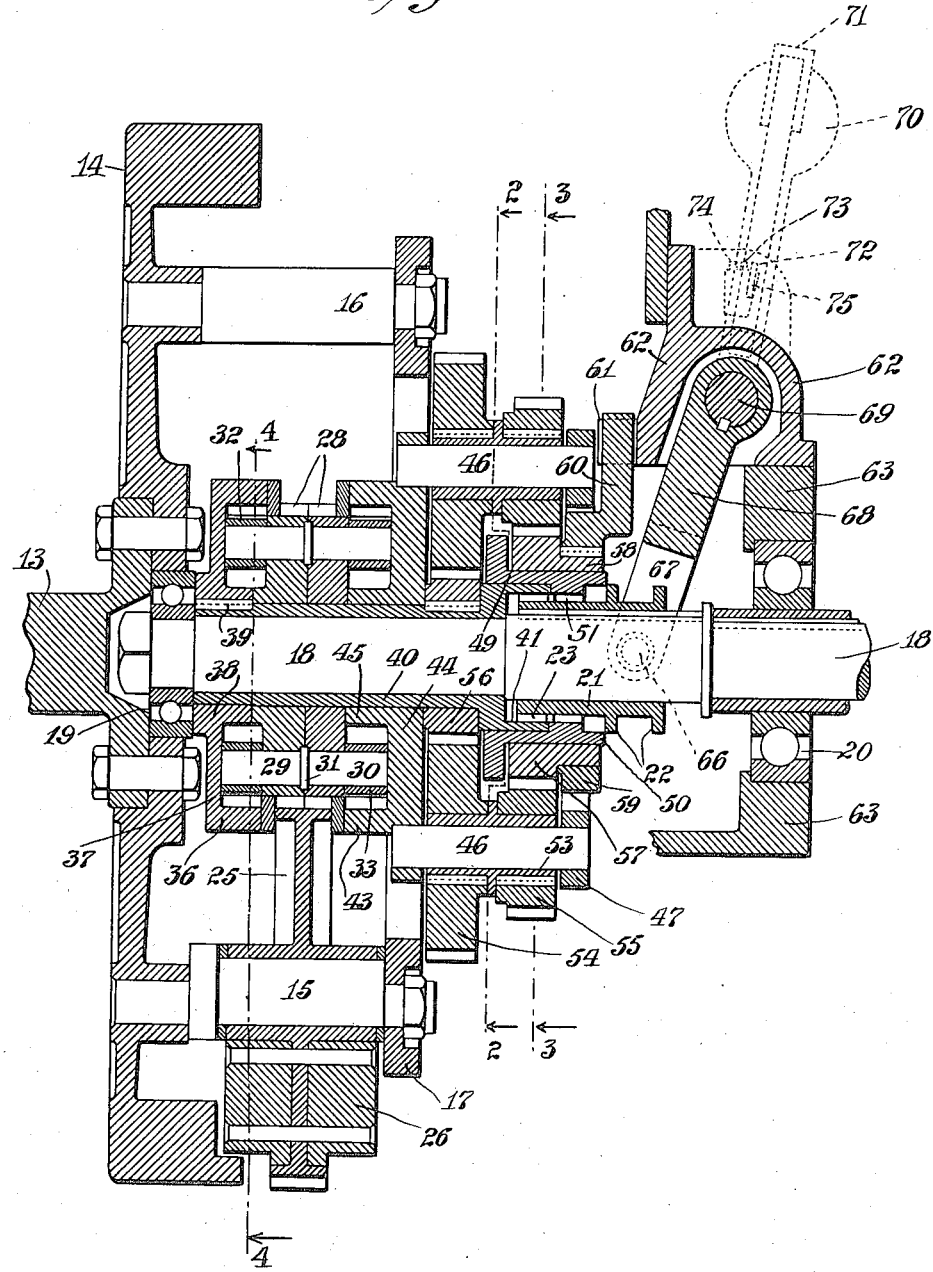

What may be termed the driving member of the present invention is shown as comprising the engine shaft 13 on which is secured the fly wheel or rotating disk 14. Three planet studs 15 are shown spaced near the periphery of the fly wheel, extending toward the right, these also acting as bolts, and three bolts 16 alternated with the studs 15, a ring 17 spanning the studs and bolts and giving rigidity to the structure.

The driven member of the combination comprises the driven shaft 18, having ball bearings 19 and 20 at spaced apart points. The driven shaft carries a sliding sleeve 21 splined to the shaft as shown, this sleeve or slide having ribs 22 forming a groove, and having clutch teeth 23, coming into action in connection with the reversing of the drive as will be explained.

On each of the studs 15 is a planet gear 25 and each of these carries at one side a weight 26, which is acted upon by centrifugal force, this force being utilized in the manner to be described. The three planetating gears all engage with a central gear 28. This is shown constructed of two symmetrically opposite halves which however after the mechanism is assembled act as a single gear. The parts of the central gear are provided with bores for receiving a set of studs 29 at the left side and 30 at the right side, with a small disk 31 accommodated between the gear halves to separate and position the respective studs. On the left hand studs are a series of pawls 32 which take part in the direct forward stroke or transmitting impulse. The right hand studs 30 carry pawls 33 which operate as will be described indirectly to transmit forward rotation to the driven shaft. As seen in Fig. 4 each pawl is acted upon by a spring 34 tending to keep it in engagement with its ratchet.

The direct forward drive pawls 32 are shown engaging an internal ratchet wheel 36, which is connected by a web 37 to a flange or hub 38. This hub is secured by key 39 to a sleeve 40 loosely surrounding the driven shaft and which may be termed the transmitting sleeve, it having a toothed extension 41, shown in Fig. 1 engaging the teeth 23 on the slide 21 splined to the driven shaft. By this arrangement, and with the parts adjusted for forward drive as shown in Fig. 1, the driven shaft, the slide, its transmitting sleeve, and the ratchet wheel 36 are all substantially rigidly connected, so that the forward rotation of the central gear 28, acting through the pawls 32, imposes a direct forward thrust on the driven shaft.

It will be understood that when the speed ratio is unity there is no internal play of the parts, and the gears 25 and weights 26 do not planetate. But when the driven shaft is rotating slower than the driving shaft the gears and weights planetate at a speed determined by the difference in driving and driven speeds. The weights forced inward by the resistance of the driven shaft cause the transmission of torque because of the centrifugal force resisting the movement of the weights in opposition to the load on the driven shaft. The thrust thus created is applied to the central gear, and through the train of connections described, to the driven shaft. This may be called the first or direct transmitting phase. When the weights pass their inward dead center the centrifugal force is reversed, tending to expedite the rotation of the planetating gears and thrust reversely on the central gear. Having described how energy is transmitted to the driven shaft in the first phase I will now describe a convenient means of utilizing the reverse thrust to communicate torque to the driven shaft during the second phase, thus giving substantially continuous drive.

The right hand pawls 33 on the central gear are shown engaging an internal ratchet wheel 43. This, like the other ratchet has a web 44 and a hub 45, which however, is loose on the transmitting sleeve 40. The pawls and ratchet 33, 43 are arranged reversely to the other so that in the second phase, when the central gear 28 is thrust reversely the ratchet 43 is likewise thrust reversely. This reverse motion due to the connections about to be described effects transmission to the driven shaft in the same direction as during the first phase.

Figure 2:
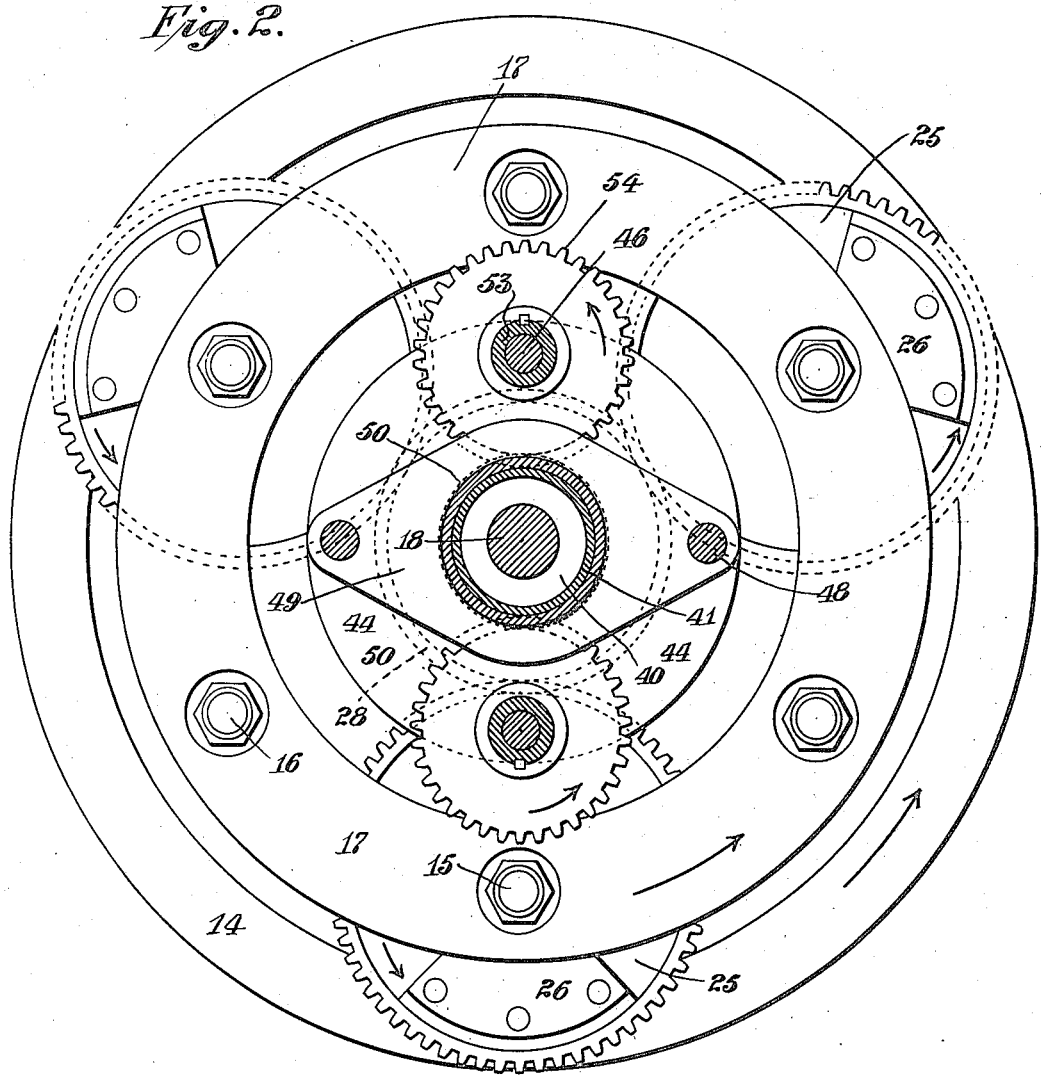
Fig. 2 is a transverse section taken on the line 2—2 of Fig. 1, the arrows showing the direction of rotation of the several parts during forward drive.

For such reverse transmission from the second ratchet 43 to the driven shaft the ratchet, or the web 44 thereof, is shown as having a pair of studs 46 extending toward the right and stiffened by a ring 47 at the right ends of the studs. On a diameter at right angles to that connecting the studs 46 is a second pair of studs 48, which are shorter than the studs 46 and are bridged by a centrally apertured plate 49, shown in Figs. 2 and 3 as of diamond shape. This plate 49, rigid with the internal ratchet 43 has a sleeve 50 extending toward the right and carrying a series of clutch teeth 51 near to the clutch teeth 41 already mentioned, and adapted to be engaged by the teeth 23 on the slide 21.

The studs 46 are for the purpose of carrying certain planetating gears. Each stud is shown as carrying a loose sleeve 53 on which is keyed a large gear 54 and a small gear 55. The large gear 54 engages with a central gear 56 keyed to the transmitting sleeve 40, while the small gear engages a central gear 57 which is held stationary. The central gear may be rendered stationary as follows. A right hand extension 58 of the gear 57 has a ring 59 keyed to it and from this ring extends upwardly an arm 60 which stands between the two prongs of a fork 61 provided on a fixed frame part 62. This frame part may be rigidly connected with the shown casing 63, which may be shaped and extended to enclose the entire mechanism hereof.

The planetating gears 54 and 55 of different sizes mounted on the reverse ratchet 43 and connected, the larger gear with the transmitting sleeve 40, and the smaller gear with the stationary pinion 57, constitute a convenient means of reversing and transmitting forwardly to the sleeve 40 the rotation of the ratchet 43 when forced backwardly by its pawl 33 while the planetating weights are moving outwardly.

The consequence of the described mechanism is that the transmitting sleeve 40 is maintained in constant rotation, in one phase through the left hand pawl and ratchet while the weights 26 are being forced inward against centrifugal force, and in the other phase through the right hand pawl and ratchet, while the weights are moving outwardly, through the reversing gears 54, 55. The teeth on the slide 21, splined to the driven shaft, being in engagement with the teeth on the sleeve 40, the driven shaft is rotated by continuous forward torque.

For reversing the direction of drive it is only necessary to shift the slide 21 so that the teeth 23 thereon are shifted into clutching engagement with the teeth 51 on the extension 50 of the plate 49 which is rigid with the second ratchet 43. The ratchet 43, and parts connected therewith, are always in gear with the transmitting sleeve 40, namely through the planetating gears 54 and 55. The sleeve is always rotating forwardly while the ratchet and connected parts including the teeth 51 are always rotating reversely at a slower speed. Therefore, the shifting of the slide permits the motor vehicle to be driven reversely at a slower speed than the forward drive, as is desirable.

For effecting such reverse adjustment the slide 21 is provided with a circumferential groove, formed by the ribs 22, this groove being engaged by roller studs 66 mounted on the arms of a yoke 67 carried on a lever 68 which is fixed to a shaft 69 upon which is also secured an upwardly extending handle 70. By throwing the handle to the left in Fig. 1 this throws the slide 21 to the right, shifting the clutching teeth 23 and reversing the drive. The handle may have a locking device or button 71 enabling the handle to be locked in three positions, 72, 73 and 74, the button 71 controlling a locking pin 75 arranged to engage any one of the three notches. The pin is shown engaged in the notch 72 for forward drive. The notch 74 gives reverse drive as explained. By the middle notch the handle is locked in middle positon, the teeth 23 engaging and clutching the teeth 51 and the teeth 41, with the result that all rotation of the mechanism is prevented, excepting the rotation of the driving member and the planetating motions of the gears 25 and weights 26. This adjustment is sometimes of use for the purpose of locking a vehicle against accidental displacement, yet permitting the engine shaft to be turned over or even driven by power.

In a broad aspect each of the centrifugal weights constitutes a yielding and reasserting device which operates with a constant resistance or pull so that the transmission is smooth and noiseless. The weight might in some cases be replaced by a spring but without securing the advantages of utilizing centrifugal force due to the rapid rotation of the driving member. In any case the substance of the present invention is that the weight or device is caused to yield in one phase and reassert itself in the next phase while the driving and driven members are rotating at different speeds, the device being connected to the driven member in a manner to deliver a forward impulse to the latter in the first phase, with other connections arranged to give also a forward thrust in the second phase. I prefer the planetating mounting of the weight to give its inward and outward movements also I prefer a planetating gear connected therewith and meshing with a central gear, which latter is thereby urged first in one direction and then the other as the weight passes through its two phases. During the first phase the one-way device or pawl and ratchet 32, 36 acts directly on the driven shaft, or the sleeve 40 which is rigidly connected with it, to give forward rotation, the one-way device precluding any retarding action in the other phase. In the second phase the reversely arranged pawl and ratchet 33, 43 operates, not directly upon the driven shaft, but on an intermediate part 44, so as to urge it reversely. The reversing gears between the part 44 and the driven shaft convert this thrust into a forward thrust on the driven shaft. In this way the transmitting impulses in both phases are delivered in the same direction to the driven shaft, and we have a substantially continuous transmission.

In substance we have a system of concentric rotating parts, the sleeve 40 rotating always in unison with the driven shaft and the part 44 rotating in a reverse direction but also in unison with the driven shaft. The centrifugal weight acts first on the part 40 in a forward direction and then on the part 44 in reverse direction, giving continuous forward thrust on the driven member. The act of reversing the mechanism to give reverse drive of the driven shaft may be described as unclutching the driven shaft from the forwardly turning part 40 and clutching it to reversely turning part 44. The parts 40 and 44 are arranged with the reversing gears between them, the latter cooperating with the stationary gear 57 in bringing about the opposite rotations.

The above description of operation refers to the case of driving at less than unit ratio and with increased torque. When the load on the driven shaft is insufficient to cause the weight to planetate, this means that the centrifugal force in the weight is sufficient to hold the weight and the planetating gear in substantially one position, so that the plantating actions, and the two phases resulting therefrom, are eliminated, and the entire mechanism rotates without internal motion.

It will thus be seen that I have described a power transmission apparatus embodying the principles and attaining the objects and advantages of the present invention. Since many matters of construction, combination, arrangement and detail may be variously modified without departing from the novel principles of the present invention it is not intended to limit the invention to such matters except in so far as specified in the appended claims.

What is claimed is:

1. A variable speed transmission apparatus comprising in combination with the rotating driving and driven members, a yielding and reasserting device arranged to be carried around with said driving member, operating to yield in one phase and reassert itself in the next phase, when the driving and driven members are rotating at different speeds, connections between said device and the driven member for rotating the latter during the first phase, and other connections for rotating the latter in the same direction during the second phase.

2. A variable speed transmission apparatus comprising in combination with the rotating driving and driven members, a centrifugal weight carried around with the driving member and fitted to move in and out during reduced ratio drive, so that in one phase while the weight is moving inwardly it is resisted by centrifugal force and in the next phase while moving out it is assisted by centrifugal force, connections between said weight and the driven member for rotating the latter and causing the weight to move in during the first phase, and other connections for rotating the latter in the same direction during the second phase.

3. Apparatus as in claim 2 and wherein the weight is guided in its in and out movements by a planetating mounting upon the driving member.

4. Apparatus as in claim 2 and wherein each set of connections includes a one-way device or pawl-and-ratchet, said two devices acting in opposite directions.

5. Apparatus as in claim 2 and wherein one of said sets of connections includes a reversing gear, so that the impulses in both phases are delivered in the same direction to the driven shaft.

6. Apparatus as in claim 2 and wherein the connections between the weight and the driven member include two oppositely rotating parts constantly in unison with the driven member, one, such as sleeve 40, turning the same direction with the driven member, and the other, such as part 44, reversely geared to turn in the opposite direction, the elements combined so that in the first phase the weight acts to urge part 40 forwardly, and in the second phase to urge part 44 reversely, whereby in both phases the driven member is urged forwardly.

7. A variable speed transmission apparatus comprising in combination with the rotating driving and driven members, a planet gear mounted on the driving member, a centrifugal weight mounted eccentrically on the gear so that the centrifugal force therein acts alternately in opposite directions on the gear when the latter rotates, a central gear meshing with the planet gear, a one-way device between the central gear and driven member whereby the latter may be driven forwardly in one phase but not retarded in the other phase, an intermediate part geared to the driven member so as to rotate oppositely from the driven member, and a one-way device between said central gear and intermediate part whereby the latter may be driven reversely, and hence the driven member forwardly, in the second phase.

8. A variable speed transmission apparatus comprising in combination with the rotating driving member, a driven member, as sleeve 40, a rotating intermediate part, as 44, means gearing said part to the driven member whereby the two rotate always in unison in opposite directions, and means actuated by the driving member for thrusting forwardly on the driven member and reversely on the intermediate part.

9. Apparatus as in claim 8 and wherein is a driven shaft adapted to be coupled with said driven member for forward drive, and uncoupled therefrom and coupled to the intermediate part for reverse drive.

In testimony whereof, I have affixed my signature hereto.

JOHN REECE.